(12) United States Patent  (10) Patent No.: US 7,444,554 B2
Hori et al.  (45) Date of Patent: Oct. 28, 2008

(54) STORAGE APPARATUS AND FAN CONTROL METHOD AND FAN CONTROL PROGRAM OF STORAGE APPARATUS

(75) Inventors: Masanori Hori, Odawara (JP); Kiyoshi Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 11/152,238

(22) Filed: Jun. 15, 2005

(65) Prior Publication Data

US 2006/0232914 A1 Oct. 19, 2006

(30) Foreign Application Priority Data

Apr. 14, 2005 (JP) ............................. 2005-116578

(51) Int. Cl.
*G06F 11/00* (2006.01)
(52) U.S. Cl. .................. 714/48; 714/1; 714/2; 720/649
(58) Field of Classification Search .................. 720/649
See application file for complete search history.

(56) References Cited

U.S. PATENT DOCUMENTS 5,848,230 A * 12/1998 Walker ........................... 714/7
6,418,539 B1 * 7/2002 Walker ........................... 714/5
7,065,600 B2 * 6/2006 Papa et al. ................... 710/302
7,200,074 B2 * 4/2007 Kano et al. ............... 369/30.28

FOREIGN PATENT DOCUMENTS

JP 6-272694 9/1994

* cited by examiner

*Primary Examiner*—Yolanda L Wilson
(74) *Attorney, Agent, or Firm*—Antonelli, Terry, Stout & Kraus, LLP.

(57) ABSTRACT

This invention provides a storage apparatus for inhibiting temperature increase in a chassis caused when a cooling fan or a module is detached and replaced due to the failure thereof. The storage apparatus comprises a controller for controlling data transfer, a power source supplying a power to a hard disk drive and the controller and having a fan, and a base chassis. The controller monitors a state of other controller and the power source, rotates the fan of the power source corresponding to the module in which a failure is detected at a first high speed higher than a normal rotational speed when detecting the failure of the other controller or the power source, and rotates the fan rotated at the first high speed at a second high speed higher than the first high speed when detecting the detachment of the module in which the failure is detected.

9 Claims, 12 Drawing Sheets

STORAGE APPARATUS AND FAN CONTROL METHOD AND FAN CONTROL PROGRAM OF STORAGE APPARATUS

CROSS-REFERENCE TO RELATED APPLICATION

The present application claims priority from Japanese Patent Application NO. JP2005-116578 filed on Apr. 14, 2005, the content of which is hereby incorporated by reference into this application.

TECHNICAL FIELD OF THE INVENTION

The present invention relates to a storage apparatus, a fan control method and a fan control program of a storage apparatus. More particularly, it relates to a technology effectively applied to a cooling fan control at the time when the failure occurs in each module and the module is detached in the storage apparatus.

BACKGROUND OF THE INVENTION

In the apparatus of the prior art having a cooling fan as the means for cooling a heat generating part such as a power source or a processor, when the temperature increase is detected by a temperature detecting circuit placed in a chassis of the apparatus, the increased temperature is reduced by making a rotational speed of the cooling fan high.

Further, in an electronic device of the prior art, the technique of increasing and reducing the rotational speed of the cooling fan in accordance with an increase and decrease of the number of shelves mounted in the chassis of the electronic device which can mount a lot of electronic circuit packages has been known (for example, refer to Japanese Patent Application Laid-Open No. 6-272694).

SUMMARY OF THE INVENTION

However, since the rotational speed of the cooling fan is made high when the temperature increase is detected in the conventional cooling fan control, the amount of air becomes insufficient due to the change of air flow at the time when detaching the module in the chassis of the apparatus, and the temperature of the other modules or the like is increased. Accordingly, a limit is placed on the detaching time of the module to prevent the temperature increase. Further, since the rotational speed of the cooling fan is made high after detecting the temperature increase, it is hard to control the cooling fan for reducing the increased temperature.

Further, in the technique described in Japanese Patent Application Laid-Open No. 6-272694, since the rotational speed of the cooling fan is increased and decreased in accordance with the increase and decrease of the number of shelves, the temperature increase occurs similarly in the other electronic circuit packages at the time when detaching the electronic circuit package mounted in the shelf.

In such a circumstance, an object of the present invention is to provide a storage apparatus which can inhibit the temperature increase in a chassis at the time when it becomes necessary to detach and replace a cooling fan or a module due to the failure in the cooling fan or the module and a fan control method and a fan control program of the storage apparatus.

A storage apparatus according to the present invention comprises: two or more controller modules controlling a data transfer with a host machine and a data transfer with a physical memory device; two or more power source modules supplying a power to the physical memory device and the controller modules and having a fan; and a chassis storing the physical memory device, the controller modules and the power source modules, wherein a first controller module of the two or more controller modules monitors a state of the other controller module and the power source module, rotates the fan of the power source module corresponding to the module in which a failure is detected at a first speed which is higher than a normal rotational speed when the failure of the other controller module and the power source module is detected, and rotates the fan rotated at the first speed at a second speed which is higher than the first speed when it is detected that the module in which the failure is detected is detached.

Also, the storage apparatus according to the present invention further comprises: two or more cooling modules having a fan for cooling the physical memory devices and the controller modules, wherein the chassis stores the physical memory devices, the controller modules, the cooling modules and the power source modules, and the first controller module of the two or more controller modules monitors a state of other controller module, the cooling modules and the power source modules, rotates the fan of the cooling module and the fan of the power source module corresponding to the module in which a failure is detected at a first speed which is higher than a normal rotational speed when the failure of each of the modules is detected, and rotates the fan rotated at the first speed at a second speed which is higher than the first speed when it is detected that the module in which the failure is detected is detached.

Also, a fan control method according to the present invention is a fan control method of a storage apparatus provided with two or more controller modules controlling a data transfer with a host machine and a data transfer with a physical memory device, two or more power source modules supplying a power to the physical memory device and the controller module and having a fan, and a chassis storing the physical memory device, the controller modules and the power source modules, which comprises the steps of: monitoring a state of the controller module and the power source module; rotating the fan of the power source module corresponding to the module in which a failure is detected at a first speed which is higher than a normal rotational speed when the failure of the controller module and the power source module is detected; and rotating the fan rotated at the first speed at a second speed which is higher than the first speed when it is detected that the module in which the failure is detected is detached.

Also, a fan control program according to the present invention is a fan control program for controlling a fan of a storage apparatus provided with two or more controller modules controlling a data transfer with a host machine and a data transfer with a physical memory device, two or more power source modules supplying a power to the physical memory device and the controller module and having a fan, and a chassis storing the physical memory device, the controller modules and the power source modules, wherein, in order to control the fan of the power source module, a processing portion in the controller module is operated as a fan control portion which monitors a state of other controller module and the power source module, rotates the fan of the power source module corresponding to the module in which a failure is detected at a first speed which is higher than a normal rotational speed when the failure of the other controller module and the power source module is detected, and rotates the fan rotated at the first speed at a second speed which is higher than the first speed when it is detected that the module in which the failure is detected is detached.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Entire Structure of Storage Apparatus>

Figure 1A:
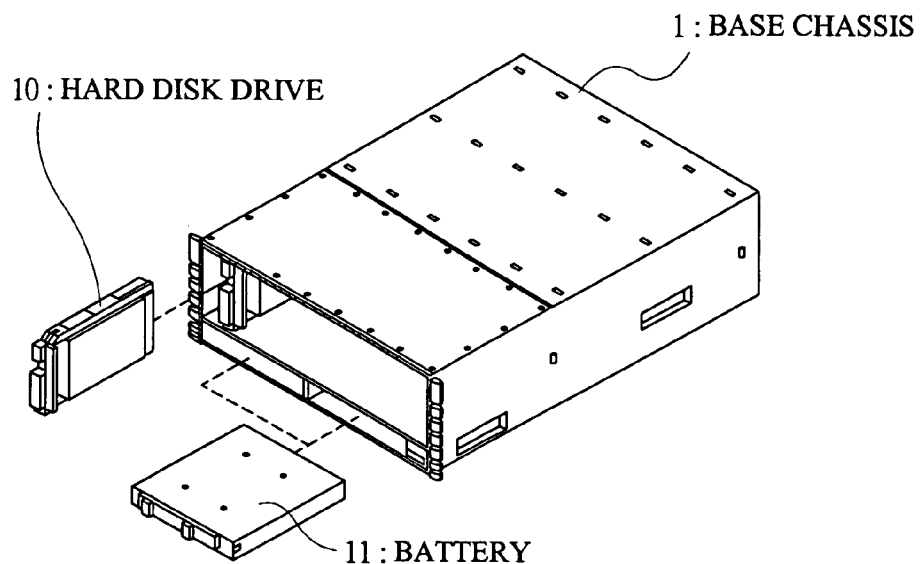
FIGS. 1A and 1B are block diagrams showing a structure of a base chassis of a storage apparatus according to an embodiment of the present invention.
Figure 1B:
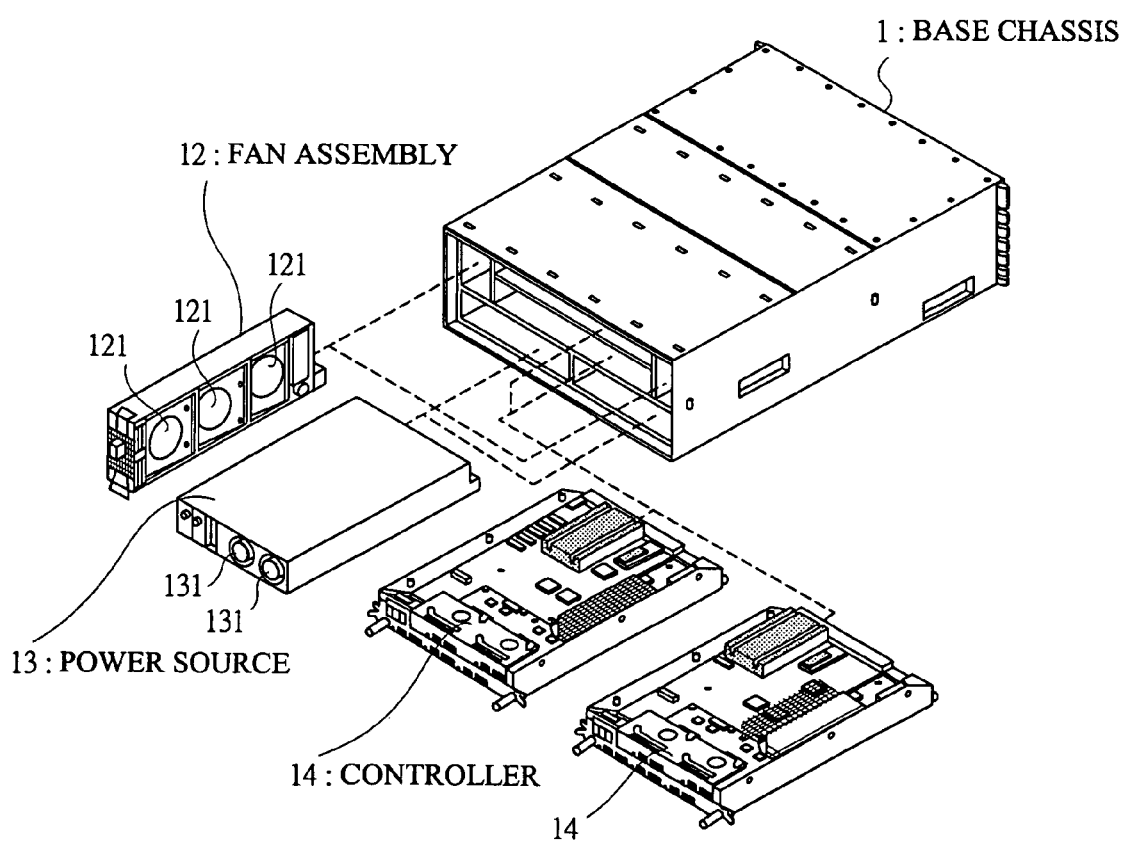
Figure 2A:
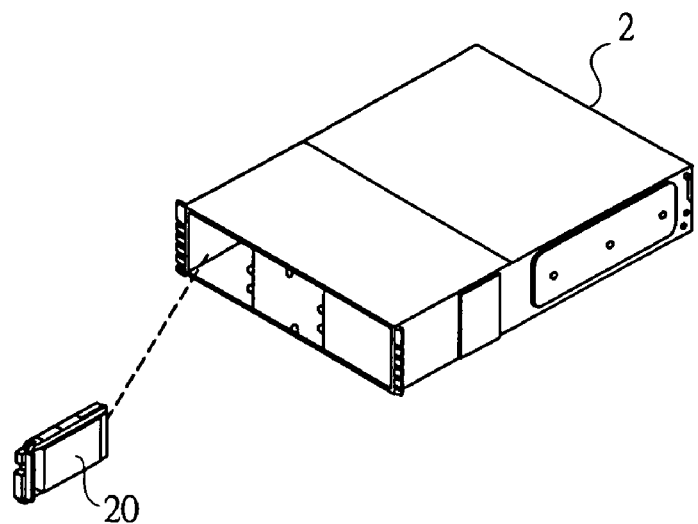
FIGS. 2A and 2B are block diagrams showing a structure of an additional chassis of the storage apparatus according to an embodiment of the present invention.
Figure 2B:
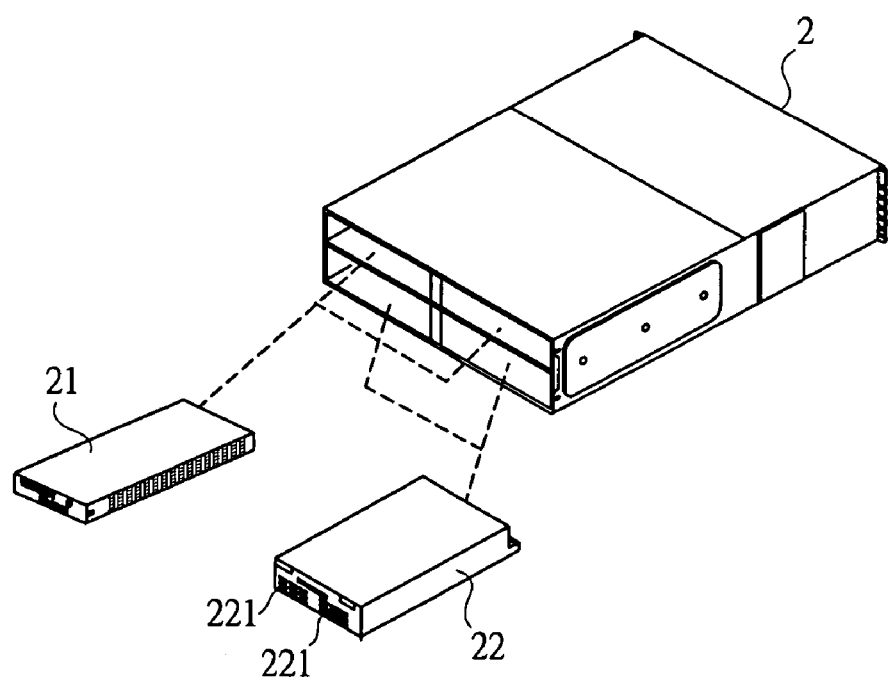

The structure of a storage apparatus according to an embodiment of the present invention will be described with reference to FIGS. 1A, 1B, 2A and 2B. FIGS. 1A, 1B, 2A and 2B are block diagrams showing the structure of the storage apparatus according to the embodiment of the present invention, in which FIGS. 1A and 1B show a structure of a base chassis and FIGS. 2A and 2B show a structure of an additional chassis. Further, FIGS. 1A and 2A are perspective views of a front side, and FIGS. 1B and 2B are perspective views of a rear side.

FIGS. 1A and 1B, a base chassis 1 of the storage apparatus is mounted with a plurality of hard disk drives (HOD) 10 serving as physical memory devices and two batteries 11 on a front side, two fan assemblies (FAN0 and FAN1) 12 serving as cooling modules and two power sources (PS0 and PS1) 13 serving as power source modules, and two controllers (CTL0 and CTL1) 14 serving as controller modules on a rear side, in which the fan assembly 12 is provided with three fans 121 and the power source 13 is provided with two fans 131.

A plurality of hard disk drives 10 are arranged next to each other in an upper stage on the front side, and two batteries 11 are arranged next to each other in lower stages on the front side.

The two fan assemblies 12 are arranged in the right and left sides of an upper stage on the rear side, the two controllers 14 are arranged in upper and lower stages of the upper stage on the rear side, and the power sources 13 are arranged next to each other in lower stages on the rear side.

The two controllers 14 are arranged in the upper and lower stages such that the upper controller 14 is turned upside down with respect to the lower controller 14 and the part mounting portions on the controllers 14 face each other.

In the base chassis 1 of the storage apparatus, the hard disk drive 10 and the controller 14 are cooled by the fans 121 of the fan assembly 12, and the power source 13 and the battery 11 are cooled by the fans 131 of the power source 13.

The controller 14 controls a data transfer with a host machine such as a host computer or the like and a data transfer with the hard disk drive 10. It also monitors the states of the fan assembly 12, the power source 13 and the other controllers 14 and controls the fan 121 of the fan assembly 12 and the fan 131 of the power source 13.

Further, in FIGS. 2A and 2B, the additional chassis 2 of the storage apparatus is mounted with a plurality of hard disk drives 20 on a front side, two additional chassis controllers (ENC0 and ENC1) 21 and two power sources (PS0 and PS1) 22 on a rear side, in which the power source 22 is provided with two fans 221.

A plurality of hard disk drives 20 are arranged next to each other on the front side.

The two additional chassis controllers 21 are arranged next to each other in upper stages on the rear side, and the power sources 22 are arranged next to each other in lower stages on the rear side.

In the additional chassis 2 of the storage apparatus, the inside of the power source 22, the hard disk drive 20 and the additional chassis controller 21 are cooled by the fan 221 of the power source 22.

The additional chassis controller 21 controls a data transfer with the controller 14 of the base chassis 1 and a data transfer with the hard disk drive 20. It also monitors the states of the power source 22 and the other additional chassis controllers 21 and controls the fan 221 of the power source 22.

Note that the fan 221 of the power source 22 can be controlled by the instruction from the controller 14 of the base chassis 1, which monitors the states of the power source 22 and the additional chassis controller 21.

Further, the base chassis 1 and the additional chassis 2 of the storage apparatus are mounted and used in a 19-inch rack on which a server and the like are mounted.

<Mounting of Controller>

Figure 3A:
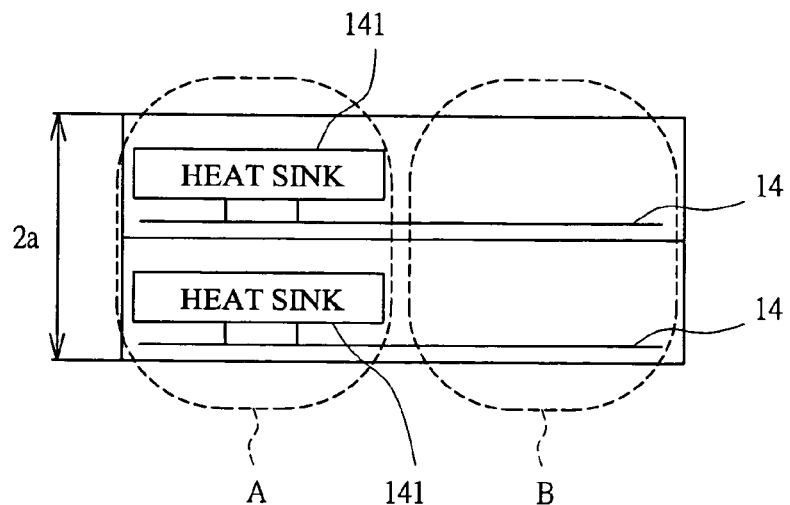
FIGS. 3A, 3B and 3C are explanatory diagrams for explaining a mounting of a controller of the storage apparatus according to an embodiment of the present invention.
Figure 3B:
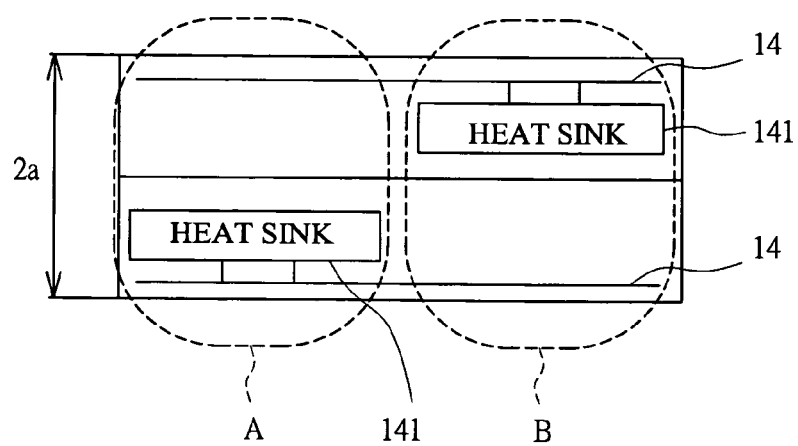
Figure 3C:
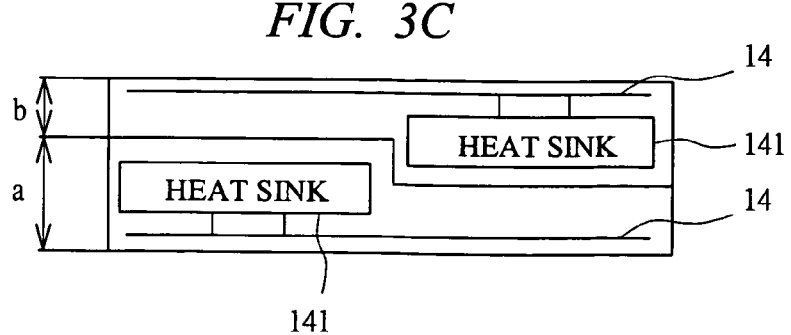

Next, a mounting of the controller of the storage apparatus according to the embodiment of the present invention will be described with reference to FIGS. 3A, 3B and 3C. FIGS. 3A, 3B and 3C are explanatory diagrams for explaining the mounting of the controller of the storage apparatus according to the embodiment of the present invention. FIG. 3A shows a conventional mounting method in which the controllers are not mounted upside down, FIG. 3B shows a mounting method in which one of the controllers is mounted upside down and FIG. 3C shows a mounting method in which one of the controllers is mounted upside down and an interval of the two controllers is made narrow.

As shown in FIG. 3A, in the case where the controllers are not mounted upside down, heat sinks 141 provided in the parts with the largest heat generation in the controller 14 are located close to one side, and it is required to circulate a lot of air from the fan to the side (portion A in FIG. 3A) close to the heat sink 141. Meanwhile, it is not necessary to circulate a lot of air to the side (portion B in FIG. 3A) in which the heat sink 141 is not provided. However, since a plurality of hard disk drives 10 are mounted in the front side of the base chassis 1 of the storage apparatus, it is necessary to uniformly circulate the air to the plurality of hard disk drives 10. Therefore, it is difficult to change the air flow by the fan between the portion A and the portion B in FIG. 3A.

Accordingly, in this embodiment, the upper controller 14 of the controllers 14 mounted in the upper and lower stages is mounted upside down as shown in FIG. 3B, and the heat sinks 141 are arranged so that they are separated into right and left sides. By doing so, it is possible to uniformly cool the two controllers 14 by uniformly circulating the air in the portion A and the portion B in FIG. 3B, and it is possible to uniformly cool a plurality of hard disk drives 10 mounted in the front side of the base chassis 1 of the storage apparatus.

In addition, in the case where the upper controller 14 is mounted upside down as shown in FIG. 3B, the heat sinks 141 of the controllers 14 are not brought into contact with each other when mounting the controllers 14. Therefore, it is possible to reduce the interval between the controllers 14 in a vertical direction as shown in FIG. 3C.

<Fan Control Operation>

Figure 4:
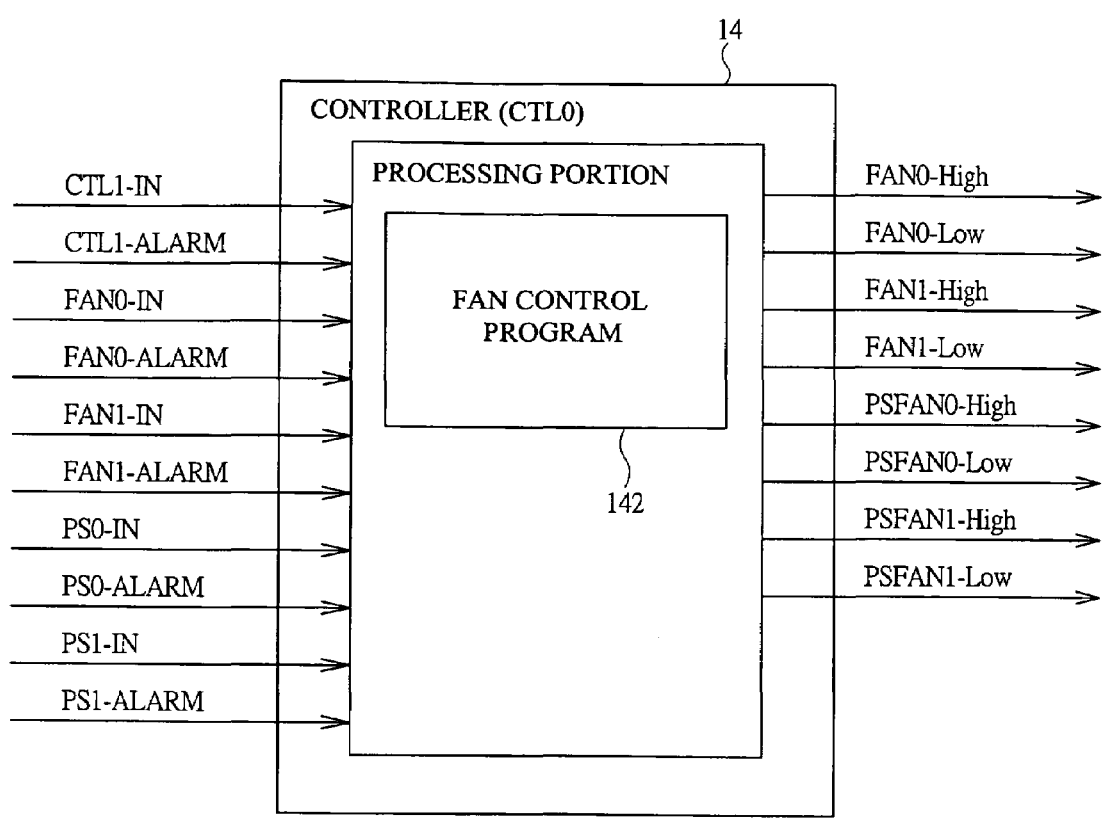
FIG. 4 is a view showing an outline of a signal of a controller portion of the storage apparatus according to an embodiment of the present invention.
Figure 5:
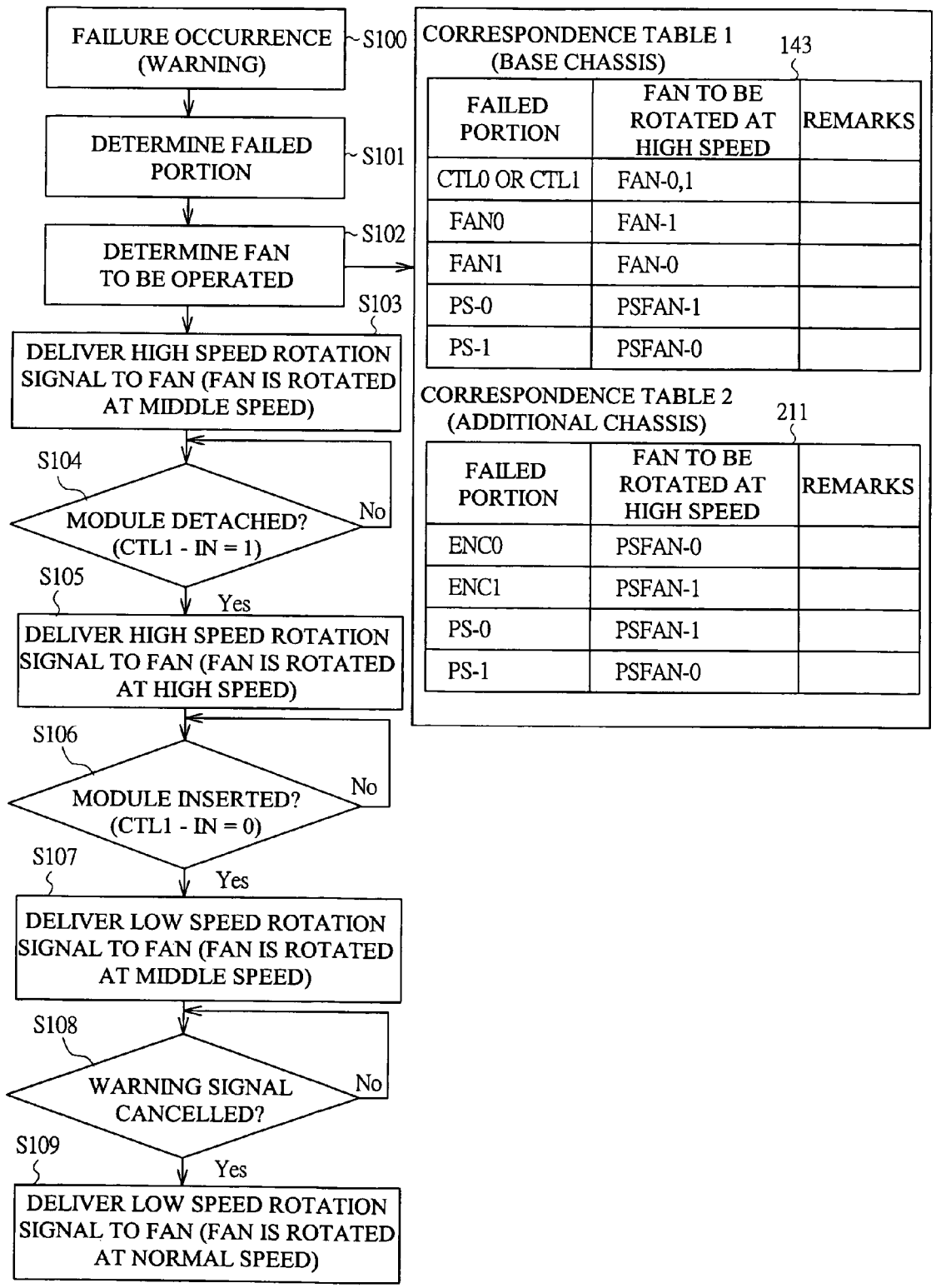
FIG. 5 is a flowchart showing a fan control operation of the storage apparatus according to an embodiment of the present invention.

Next, an operation for controlling the fan of the storage apparatus according to the embodiment of the present invention will be described with reference to FIGS. 4 and 5. FIG. 4 is a view showing an outline of the signal of a controller portion of the storage apparatus according to the embodiment of the present invention, and FIG. 5 is a flowchart showing the operation for controlling the fan of the storage apparatus according to the embodiment of the present invention.

The fan 121 of the fan assembly 12, the fan 131 of the power source 13 and the fan 221 of the power source 22 are controlled by executing a fan control program stored in the controller 14 and the additional chassis controller 21 by a processing portion composed of microprocessors, memory portions and the like in the controller 14 and the additional chassis controller 21 so as to operate the processing portion as a fan control portion. Signals showing the states of the modules in the other portions are inputted to the controller 14 and the additional chassis controller 21, and control signals to the respective fans are outputted on the basis of the process in accordance with the fan control program, thereby executing the control of the respective fans.

For example, in the case of the controller (CTL0) 14 of the base chassis 1, as shown in FIG. 4, the signals as follows are inputted to the controller (CTL0) 14 of the base chassis 1, that is, signals "CTL1-IN" and "CTL1-ALARM" showing the state of the controller (CTL1) 14, signals "FAN0-IN" and "FAN0-ALARM" showing the state of the fan assembly (FAN0) 12, signals "FAN1-IN" and "FAN1-ALARM" showing the state of the fan assembly (FAN1) 12, signals "PS0-IN" and "PS0-ALARM" showing the state of the power source (PS0) 13, and signals "PS1-IN" and "PS1-ALARM" showing the state of the power source (PS1) 13 are inputted.

Further, each of the signals is inputted to the processing portion which executes the fan control program 142, and the signals as follows are outputted on the basis of the process in accordance with the fan control program 142, that is, "FAN0-High" and "FAN0-Low" controlling an operation of the fan 121 of the fan assembly (FAN0) 12, signals "FAN1-High" and "FAN1-Low" controlling an operation of the fan 121 of the fan assembly (FAN1) 12, signals "PSFAN0-High" and "PSFAN0-Low" controlling an operation of the fan 131 of the power source (PS0) 13, and signals "PSFAN1-High" and "PSFAN1-Low" controlling an operation of the fan 131 of the power source (PS1) 13 are outputted. Then, the controller 14 and the additional chassis controller 21 control the rotational speed of the respective fans on the basis of these control signals.

In the control operation of each fan, as shown in FIG. 5, when a failure (warning) occurs in a certain module (S100), a failed portion is first determined on the basis of a warning signal (for example, CTL1-ALARM) to the module (S101).

Further, correspondence tables (143 and 211) showing the correspondence between the failed portion and the fan whose rotational speed is to be made higher are respectively stored in the controller 14 and the additional chassis controller 21, and the fan corresponding to the failed portion determined in S101 is determined (for example, FAN-0 and FAN-1) on the basis of the contents of the correspondence tables (143 and 211) (S102).

Then, a high-speed rotation signal (for example, FAN0-High and FAN1-High) is delivered to the fan determined in S102 (S103).

The rotational speed of the fan becomes higher than that in a normal operation by the high-speed rotation signal in S103, and it becomes a middle-speed rotation.

Thereafter, on the basis of a signal (for example, CTL1-IN=1) showing a detached state of the module, it is determined whether or not the failed module is detached (S104). If it is determined in S104 that the module is not detached, the step goes back to S104, and if it is determined in S104 that the module is detached, a high-speed rotation signal (for example, FAN0-High and FAN1-High) is delivered to the fan determined in S102 (S105).

The rotational speed of the fan becomes higher than that in S103 by the high-speed rotation signal in S105, and it becomes a high-speed rotation.

Then, on the basis of a signal (for example, CTL1-IN=0) showing an inserted state of the module, it is determined whether or not the failed module is replaced and inserted (S106). If it is determined in S106 that the module is not inserted, the step goes back to S106, and if it is determined in S106 that the module is inserted, a low-speed rotation signal (for example, FAN0-Low and FAN1-Low) is delivered to the fan determined in S102 (S107).

The rotational speed of the fan becomes lower than that in S105 by the low-speed rotation signal in S107, and it becomes a middle-speed rotation.

Thereafter, it is determined whether or not the warning signal from the module of the failed portion is cancelled (S108). If it is determined in S108 that the signal is not cancelled, the step goes back to S108, and if it is determined in S108 that the signal is cancelled, a low-speed rotation signal (for example, FAN0-Low and FAN1-Low) is delivered to the fan determined in S102 (S109).

The rotational speed of the fan becomes lower than that in S107 by the low-speed rotation signal in S109, and it becomes a normal rotation.

According to the process mentioned above, since the rotational speed of the fan at the time when the failure occurs in each of the modules and the module is detached for replacing the failed module is optimally controlled, it is possible to optimally control the air flow in the chassis at the time when the failure occurs in the module and the module is detached. Consequently, it is possible to effectively inhibit the temperature increase in the chassis.

<Air Flow in Chassis>

Figure 6:
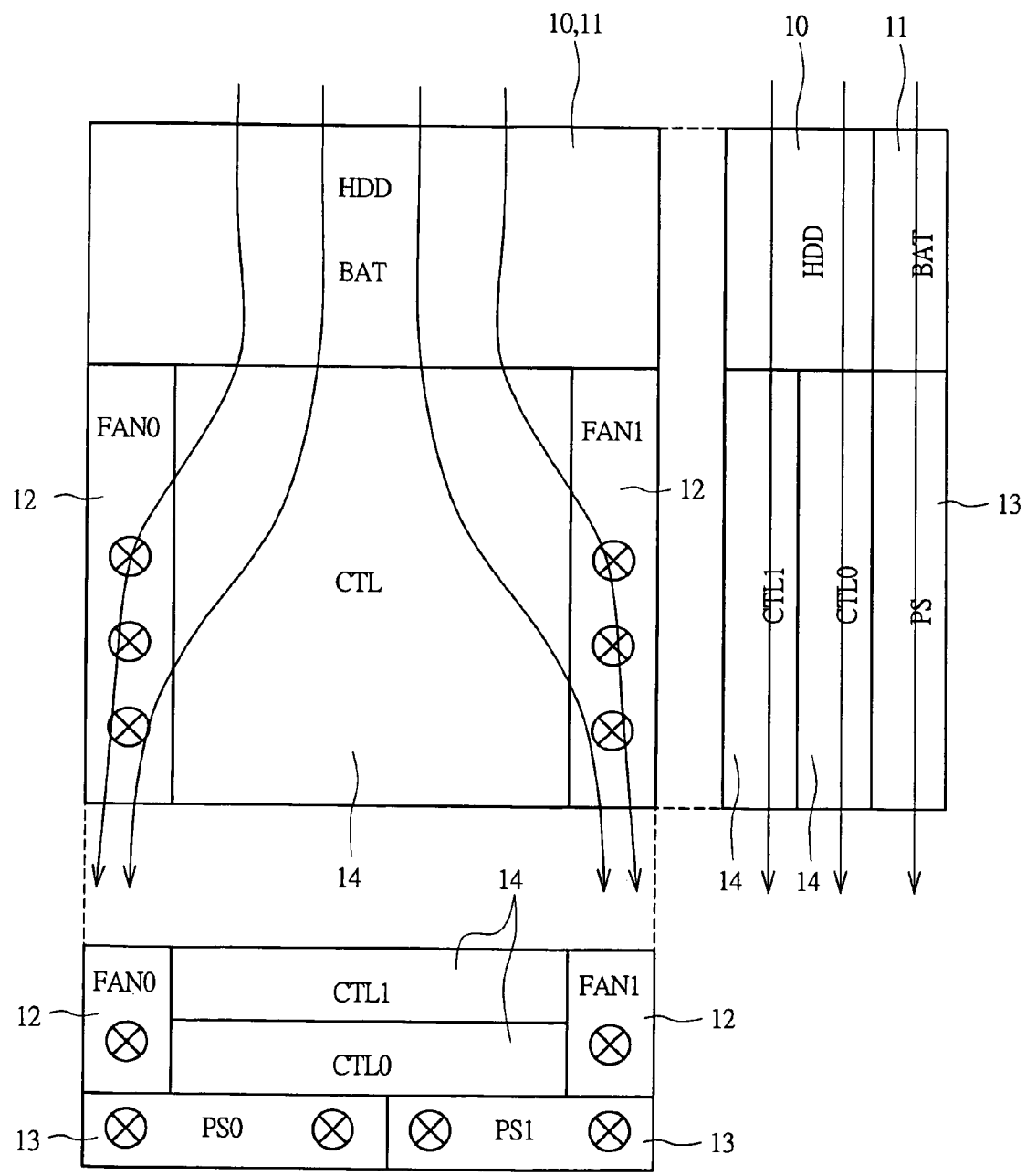
FIG. 6 is a view showing air flow at a normal time in the base chassis of the storage apparatus according to an embodiment of the present invention.
Figure 7:
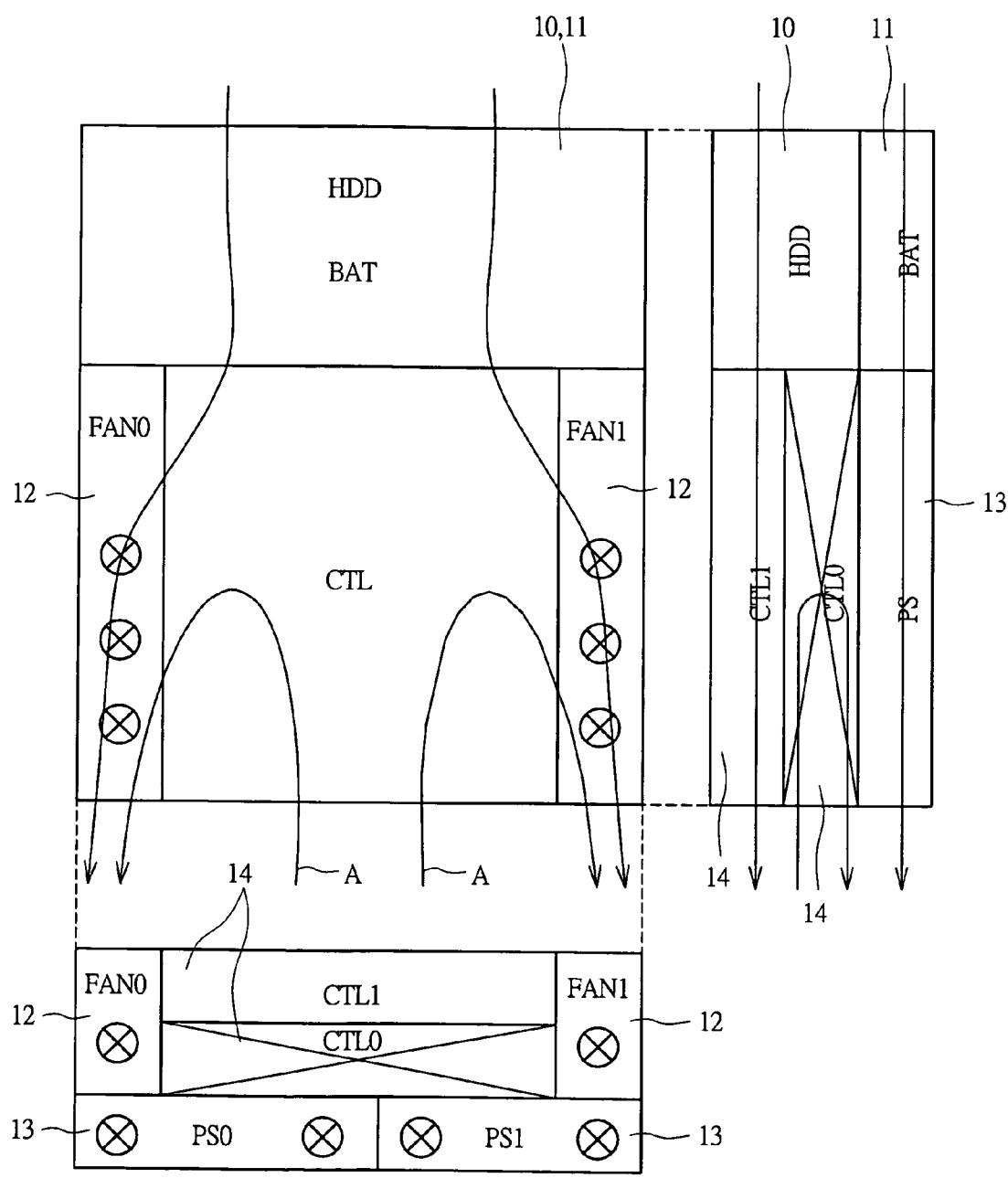
FIG. 7 is a view showing air flow at a time when detaching a controller in the base chassis of the storage apparatus according to an embodiment of the present invention.
Figure 8:
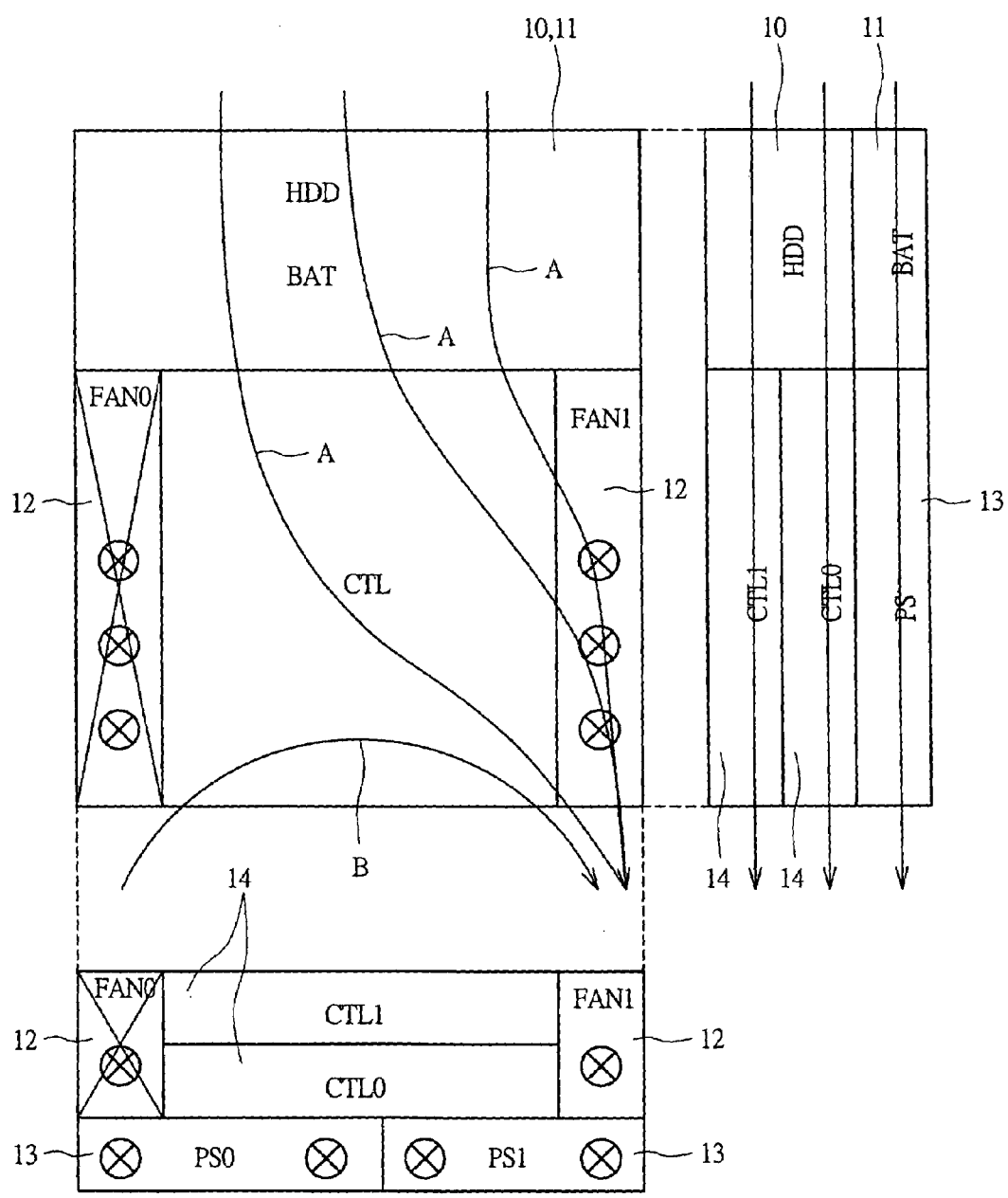
FIG. 8 is a view showing air flow at a time when detaching a fan assembly in the base chassis of the storage apparatus according to an embodiment of the present invention.
Figure 9:
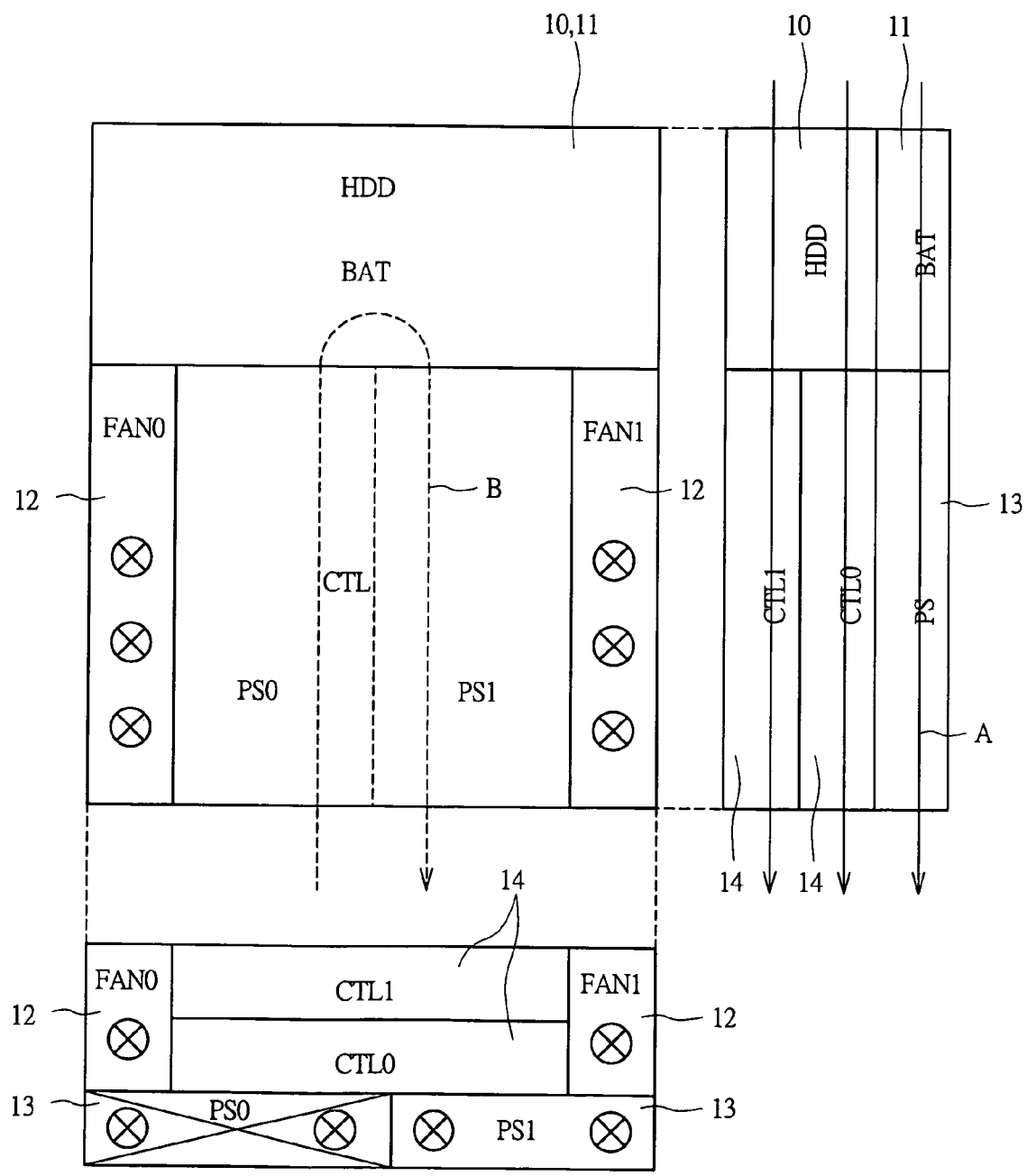
FIG. 9 is a view showing air flow at a time when detaching a power source in the base chassis of the storage apparatus according to an embodiment of the present invention.
Figure 10:
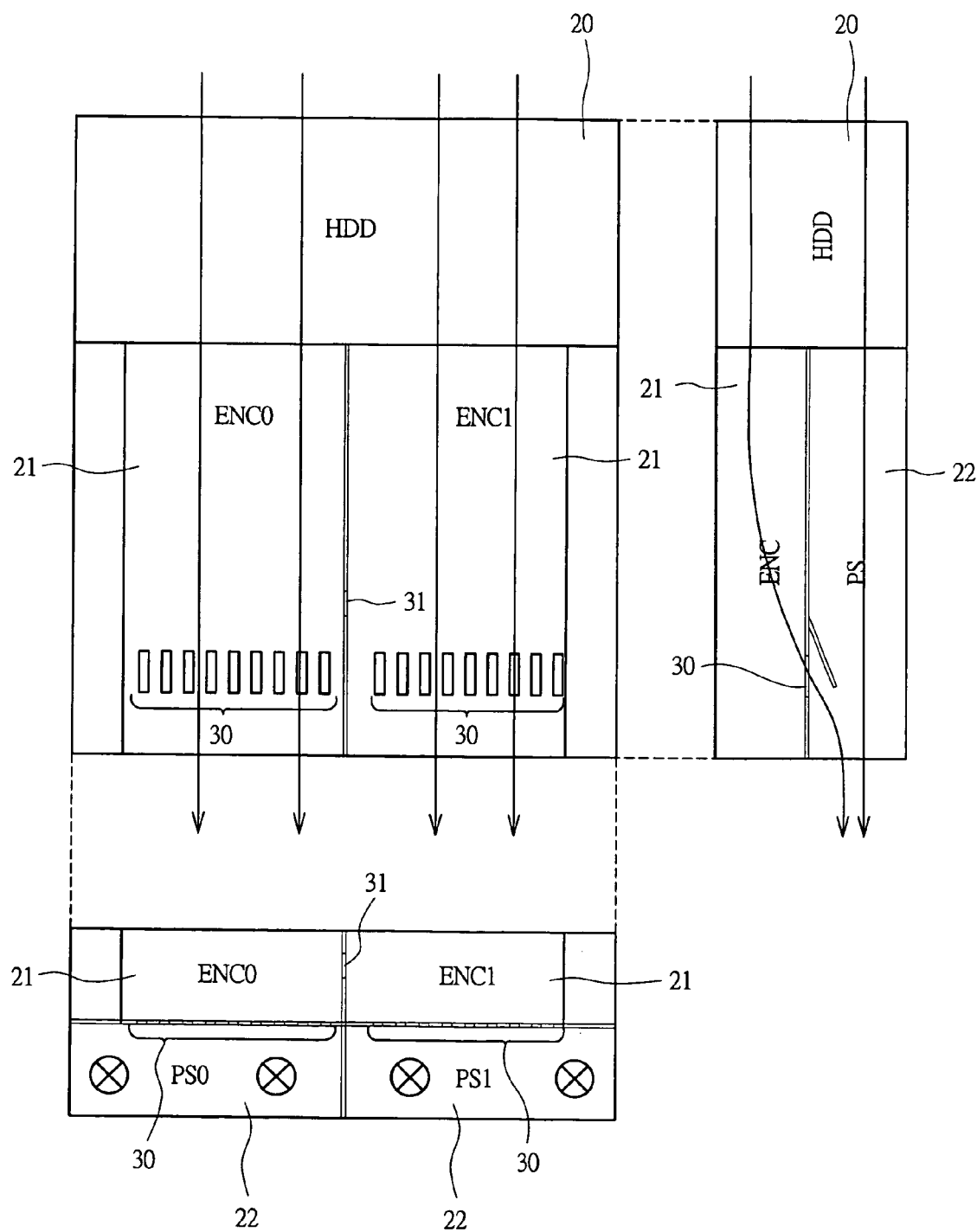
FIG. 10 is a view showing air flow at a normal time in the additional chassis of the storage apparatus according to an embodiment of the present invention.
Figure 11:
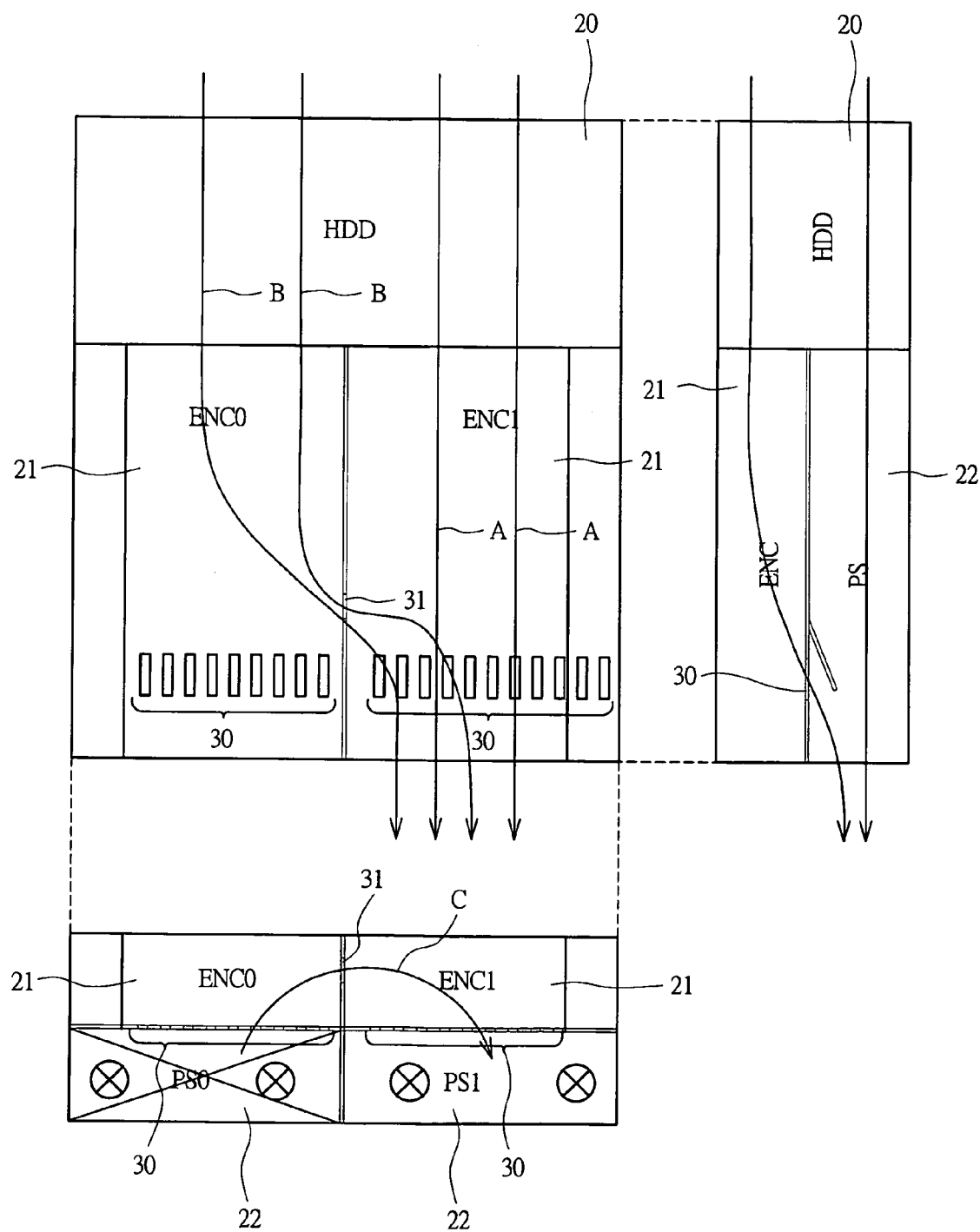
FIG. 11 is a view showing air flow at a time of detaching a power source in the additional chassis of the storage apparatus according to an embodiment of the present invention.
Figure 12:
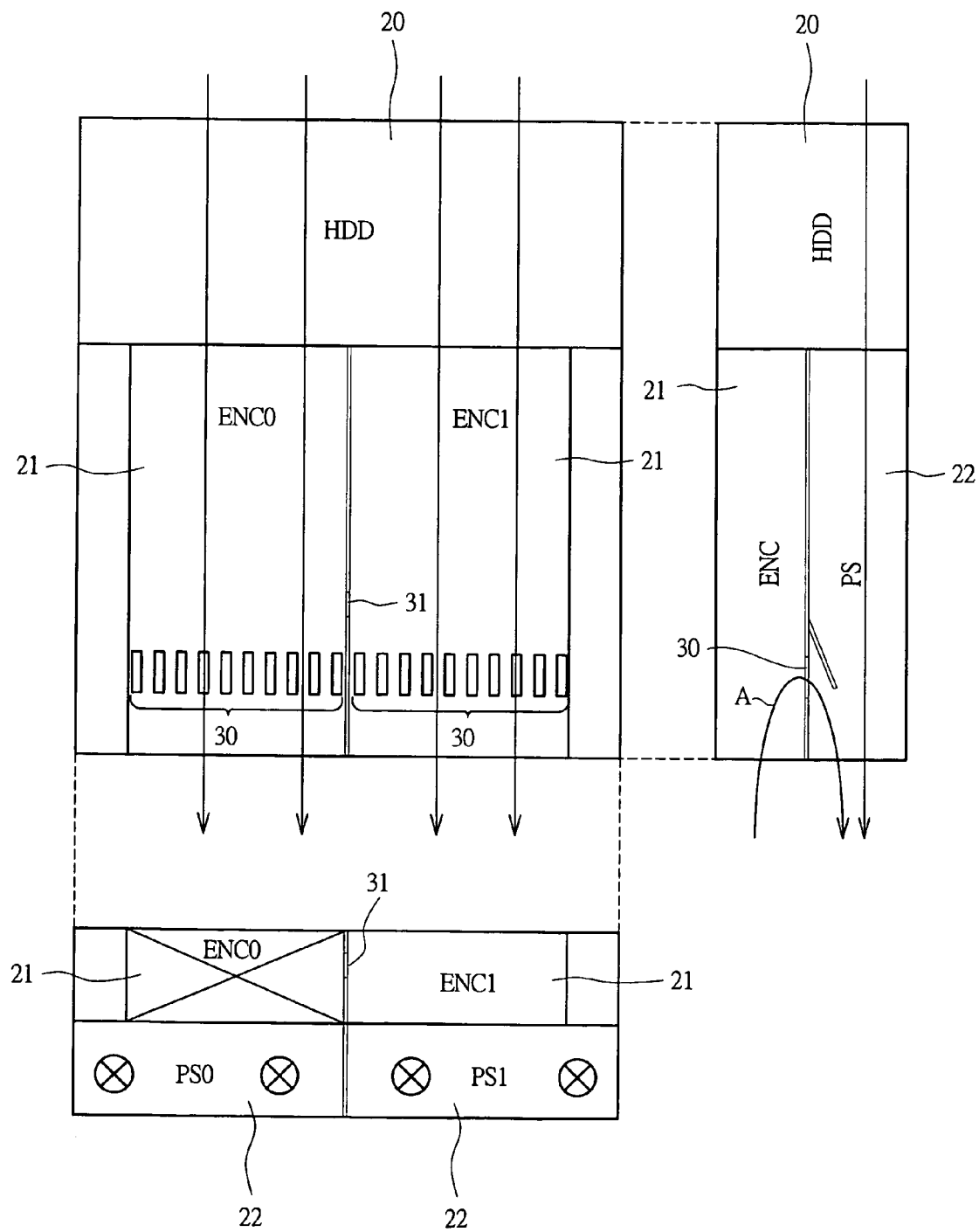
FIG. 12 is a view showing air flow at a time of detaching an additional chassis controller in the additional chassis of the storage apparatus according to an embodiment of the present invention.

Next, the air flow in the storage apparatus according to the embodiment of the present invention will be described with reference to FIGS. 6 to 12. FIGS. 6 to 12 are views showing the air flow in the storage apparatus according to the embodiment of the present invention, in which FIG. 6 is a view showing the air flow at the normal time in the base chassis, FIG. 7 is a view showing the air flow at the time of detaching a controller in the base chassis, FIG. 8 is a view showing the air flow at the time of detaching a fan assembly in the base chassis, FIG. 9 is a view showing the air flow at the time of detaching a power source in the base chassis, FIG. 10 is a view showing the air flow at the normal time in the additional chassis, FIG. 11 is a view showing the air flow at the time of detaching a power source in the additional chassis, and FIG. 12 is a view showing the air flow at the time of detaching an additional chassis controller in the additional chassis.

First, as shown in FIG. 6, the air flow at the normal time in the base chassis 1 includes the air flow to the controller 14 on the rear side from the hard disk drive 10 on the front side by the fan 121 of the fan assembly 12 and the air flow to the power source 13 from the battery 11 by the fan 131 of the power source 13. These two air flows are independent and the change in one air flow does not affect the other air flow.

Also, at the time when the failure occurs in the controller (CTL0) 14, the fan 121 of the fan assembly 12 which cools the controller 14 is first rotated at a high speed, and the amount of air flow is increased while keeping the air flow shown in FIG. 6.

Thereafter, in the air flow at the time when the controller (CTL0) 14 is detached in the replacement work of the failed controller (CTL0) 14, as shown in FIG. 7, the air flow (shown by reference symbol A in FIG. 7) from the position where the detached controller (CTL0) 14 is arranged to the fan assembly 12 is generated in addition to the air flow at the normal time, and the amount of air flow at the normal time is reduced. However, at this time, the fan 121 of the fan assembly 12 for cooling the controller 14 is rotated at a further higher speed, and the amount of air is increased.

Consequently, the amount of air is first increased at the time when the failure occurs in the controller (CTL0) 14 in order to inhibit the temperature increase in the chassis due to the change in air flow at the time of detaching the controller (CTL0) 14 for the replacement work after the failure, and the amount of air is further increased at the time of actually detaching the controller (CTL0) 14. Therefore, it is possible to optimally control the air flow in the chassis with respect to the change in air flow caused by detaching the controller (CTL0) 14, and it is possible to effectively inhibit the temperature increase in the chassis.

In addition, at the time when the failure occurs in the fan assembly (FAN0) 12, the fan assembly (FAN1) 12 for cooling the hard disk drive 10 and the controller 14 is first rotated at a high speed together with the fan assembly (FAN0) 12, and the amount of air flow (shown by reference symbol A in FIG. 8) from the hard disk drive 10 and the controller 14 to the fan assembly (FAN1) 12 is increased. Consequently, it is possible to cool the hard disk drive 10 and the controller 14 even when the fan assembly (FAN0) 12 is failed and is not operated.

Thereafter, in the air flow at the time when the fan assembly (FAN0) 12 is detached in the replacement work of the failed fan assembly (FAN0) 12, as shown in FIG. 8, the air flow (shown by reference symbol B in FIG. 8) from the position where the detached fan assembly (FAN0) 12 is arranged to the fan assembly (FAN1) 12 is generated in addition to the air flow at the time when the failure occurs in the fan assembly (FAN0) 12, and the amount of the air flow is reduced. However, at this time, the fan 121 of the fan assembly (FAN1) 12 is rotated at a further higher speed, and the amount of air is increased.

Consequently, the fan 121 of the fan assembly (FAN1) 12 is first rotated at a high speed at the time when the failure occurs in the fan assembly (FAN0) 12 so as to maintain the amount of air in the chassis, and the amount of air is further increased at the time when detaching the fan assembly (FAN0) 12. Therefore, it is possible to optimally control the air flow in the chassis with respect to the change in air flow caused by detaching the fan assembly (FAN0) 12, and it is possible to effectively inhibit the temperature increase in the chassis.

Also, at the time when the failure occurs in the power source (PS0) 13, the fan 131 of the power source (PS1) 13 is first rotated at a high speed in order to inhibit the temperature increase of the power source (PS1) 13 itself due to the load increase of the power source (PS1) 13 resulting from the failure of the power source (PS0) 13, and the amount of air flow (shown by reference symbol A in FIG. 9) to the power source (PS1) 13 from the battery 11 shown in FIG. 9 is increased.

Thereafter, in the air flow at the time when detaching the power source (PS0) 13 in the replacement work of the failed power source (PS0) 13, as shown in FIG. 9, the air flow (shown by reference symbol B in FIG. 9) to the power source (PS1) 13 from the power source (PS0) 13 is generated. However, the amount of air for cooling the power source (PS1) 13 is not changed and the heat generation of the battery 11 is small. Therefore, in this embodiment, at the time of detaching the power source (PS0) 13, the fan 131 of the power source (PS1) 13 is kept in the high-speed rotation similar to that of the time when the failure occurs in the power source (PS0) 13.

Note that, at the time when detaching the power source (PS0) 13, it is also preferable that the fan is rotated at a further higher speed than the high-speed rotation at the time when the failure occurs in the power source (PS0) 13.

Further, the fan 131 of the failed power source (PS0) 13 can be operated by the power source (PS1) 13 which is not failed. Even in this case, at least the fan 131 of the power source (PS1) 13 is rotated at a high speed because of the load increase of the power source (PS1) 13 which is not failed.

Further, as shown in FIG. 10, slit-shaped vent holes 30 for circulating the air to the fan 221 of the power source 22 from the additional chassis controller 21 are provided, and the air flow at the normal time of the additional chassis 2 includes the air flow from the hard disk drive 20 on the front side to the power source 22 via the additional chassis controller 21 on the rear side and the air flow from the hard disk drive 20 to the power source 22.

Note that a vent hole 31 as shown in FIG. 10 is provided between the additional chassis controller (ENC0) 21 and the additional chassis controller (ENC1) 21 of the additional chassis 2. However, no air flows through the vent hole 31 and the air does not flow between the additional chassis controller (ENC0) 21 and the additional chassis controller (ENC1) 21 at the normal time.

Also, in the additional chassis controller 21 and the power source 22, the holes are provided at the positions corresponding to the vent holes 30 and the vent hole 31 of the additional chassis 2, and the air flows through the vent holes 30 and the vent hole 31.

In addition, at the time when the failure occurs in the power source (PS0) 22, the fan 221 of the power source (PS1) 22 is first rotated at a high speed in order to inhibit the temperature increase of the power source (PS1) 22 itself due to the load increase of the power source (PS1) 22 resulting from the failure of the power source (PS0) 22 and compensate the reduction of the amount air due to the stop of the fan 221 of the power source (PS0) 22, and the amount of air flow (shown by reference symbol A in FIG. 11) from the hard disk drive 20 to the power source (PS1) 22 shown in FIG. 11 is increased.

Further, since the air flow by the fan 221 of the power source (PS0) 22 is stopped, the air from the hard disk drive 20 to the additional chassis controller (ENC0) 21 flows to the additional chassis controller (ENC1) 21 side via the vent hole 31 and flows to the power source (PS1) 22 via the vent holes 30 (reference symbol B in FIG. 11).

Thereafter, in the air flow at the time when detaching the power source (PS0) 22 in the replacement work of the failed power source (PS0) 22, as shown in FIG. 11, the air flows from the power source (PS0) 22 to the additional chassis controller (ENC0) 21 via the vent holes 30, and the air flows to the power source (PS1) 22 via the vent hole 31 together with the air flow from the hard disk drive 20 to the additional chassis controller (ENC0) 21, and thus, the amount of air is reduced. However, the fan 221 of the power source (PS1) 22 is rotated at a further higher speed, and the amount of air is increased.

Consequently, the fan 221 of the power source (PS1) 22 is first rotated at a high speed at the time when the failure occurs in the power source (PS0) 22 so as to maintain the amount of air in the chassis, and the amount of air is further increased at the time when detaching the power source (PS0) 22. Therefore, it is possible to optimally control the air flow in the chassis with respect to the change in air flow caused by detaching the power source (PS0) 22, and it is possible to effectively inhibit the temperature increase in the chassis.

Furthermore, at the time when the failure occurs in the additional chassis controller (ENC0) 21, the fan 221 of the power source (PS0) 22 for cooling the additional chassis controller (ENC0) 21 is first rotated at a high speed, and the amount of air on the power source (PS0) 22 side is increased while keeping the air flow shown in FIG. 10.

Thereafter, in the air flow at the time of detaching the additional chassis controller (ENC0) 21 in the replacement work of the failed additional chassis controller (ENC0) 21, as shown in FIG. 12, the air flow (reference symbol A in FIG. 12) from the position where the detached additional chassis controller (ENC0) 21 is arranged to the power source (PS0) 22 is generated in addition to the air flow at the normal time, and the amount of air flow at the normal time is reduced. However, at this time, the fan 221 of the power source (PS0) 22 for cooling the additional chassis controller (ENC0) 21 is rotated at a further higher speed, and the amount of air is increased.

Consequently, the amount of air is first increased at the time when the failure occurs in the additional chassis controller (ENC0) 21 in order to inhibit the temperature increase in the chassis due to the change in air flow at the time when detaching the additional chassis controller (ENC0) 21 caused by the replacement work after the failure, and the amount of air is further increased at the time of actually detaching the additional chassis controller (ENC0) 21. Therefore, it is possible to optimally control the air flow in the chassis with respect to the change in air flow caused by detaching the additional chassis controller (ENC0) 21, and it is possible to effectively inhibit the temperature increase in the chassis.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the embodiment of the present invention has been described based on the structure example of the base chassis 1 and the additional chassis 2 of the storage apparatus as shown in FIGS. 1 and 2. However, the structure is not limited to the structure example, and even in the structure in which each of the modules such as the hard disk drive, the controller, the power source, the fan assembly and the like is arranged in a different way and the vent holes are arranged in a different way, it is possible to optimally control the air flow by preparing a correspondence table showing the fan for the failed portion in accordance with the change in air flow at the time when the failure occurs in each module and the module is detached.

According to the present invention, it is possible to optimally control the rotational speed of the fan at the time when the failure occurs in each of the modules and the rotational speed of the fan at the time when detaching the module for replacing the failed module after the occurrence of the failure. Therefore, it is possible to optimally control the air flow in the chassis at the time when the failure occurs in the module and the time when detaching the module, and also possible to effectively inhibit the temperature increase in the chassis.

What is claimed is:

1. A storage apparatus comprising:
   two or more controller modules controlling a data transfer with a host machine and a data transfer with a physical memory device;
   two or more power source modules supplying a power to said physical memory device and said controller modules and having a fan; and
   a chassis storing said physical memory device, said controller modules and said power source modules,
   wherein a first controller module of said two or more controller modules monitors a state of the other controller module and said power source module, rotates the fan of said power source module corresponding to the module in which a failure is detected at a first speed which is higher than a normal rotational speed when the failure of said other controller module and said power source module is detected, and rotates the fan rotated at said first speed at a second speed which is higher than said first speed when it is detected that said module in which the failure is detected is detached.

2. The storage apparatus according to claim 1,
   wherein said chassis is provided with vent holes through which air generated by the fan of said power source module flows between said two controller modules, between said two power source modules and between said controller module and said power source module, and
   said controller module and said power source module are provided with vent holes at positions corresponding to said vent holes of said chassis at a time when stored in said chassis.

3. The storage apparatus according to claim 1,
   wherein said two or more controller modules are mounted two by two in a state where part mounting portions thereof face each other when stored in said chassis.

4. The storage apparatus according to claim 1,
   wherein the first controller module of said two or more controller modules has a correspondence table showing a relation of the fan of said power source module which is to be rotated at a higher speed than the normal rotation for the failure of said other controller module and the power source module, and determines the fan of said power source module which is rotated at a higher speed than the normal rotation on the basis of said correspondence table when the failure of said other controller module and said power source module is detected.

5. The storage apparatus according to claim 1, further comprising:
two or more cooling modules having a fan for cooling said physical memory devices and said controller modules,
wherein said chassis stores said physical memory devices, said controller modules, said cooling modules and said power source modules, and
the first controller module of said two or more controller modules monitors a state of other controller module, said cooling modules and said power source modules, rotates the fan of said cooling module and the fan of said power source module corresponding to the module in which a failure is detected at a first speed which is higher than a normal rotational speed when the failure of each of the modules is detected, and rotates the fan rotated at said first speed at a second speed which is higher than said first speed when it is detected that said module in which the failure is detected is detached.

6. A fan control method of a storage apparatus provided with two or more controller modules controlling a data transfer with a host machine and a data transfer with a physical memory device, two or more power source modules supplying a power to said physical memory device and said controller module and having a fan, and a chassis storing said physical memory device, said controller modules and said power source modules, said method comprising the steps of: monitoring a state of said other controller module and said power source module; rotating the fan of said power source module corresponding to the module in which a failure is detected at a first speed which is higher than a normal rotational speed when the failure of said other controller module and said power source module is detected; and
rotating the fan rotated at said first speed at a second speed which is higher than said first speed when it is detected that said module in which the failure is detected is detached.

7. The fan control method of a storage apparatus according to claim 6,
wherein, when determining the fan of said power source module corresponding to the module in which the failure is detected, the determination is made based on a correspondence table showing a relation of the fan of said power source module which is to be rotated at a higher speed than the normal rotation for the failure of said controller module and said power source module.

8. A computer-readable medium including a fan control program for controlling a fan of a storage apparatus provided with two or more controller modules controlling a data transfer with a host machine and a data transfer with a physical memory device, two or more power source modules supplying a power to said physical memory device and said controller module and having a fan, and a chassis storing said physical memory device, said controller modules and said power source modules,
wherein, in order to control the fan of said power source module, a processing portion in said controller module is operated as a fan control portion which monitors a state of other controller module and said power source module, rotates the fan of said power source module corresponding to the module in which a failure is detected at a first speed which is higher than a normal rotational speed when the failure of said other controller module and said power source module is detected, and rotates the fan rotated at said first speed at a second speed which is higher than said first speed when it is detected that said module in which the failure is detected is detached.

9. The medium according to claim 8,
wherein, when determining the fan of said power source module corresponding to the module in which the failure is detected, the processing portion in said controller module is operated as a fan control portion which makes a determination based on a correspondence table showing a relation of the fan of said power source module which is to be rotated at a higher speed than the normal rotation for the failure of said controller module and said power source module.

* * * * *